United States Patent
Chen et al.

(10) Patent No.: US 6,857,024 B1
(45) Date of Patent: Feb. 15, 2005

(54) SYSTEM AND METHOD FOR PROVIDING ON-LINE ADVERTISING AND INFORMATION

(75) Inventors: Michael C. Chen, San Jose, CA (US); Jan Fandrianto, Los Gatos, CA (US); Steve Toteda, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 764 days.

(21) Appl. No.: 09/643,321

(22) Filed: Aug. 21, 2000

Related U.S. Application Data

(60) Provisional application No. 60/161,168, filed on Oct. 22, 1999.

(51) Int. Cl.$^7$ .......................... G06F 15/16; H04M 15/00
(52) U.S. Cl. .................... 709/231; 379/114.13
(58) Field of Search ................... 709/203, 206, 709/227, 231, 233; 379/114.13

(56) References Cited

U.S. PATENT DOCUMENTS

| | | | | |
|---|---|---|---|---|
| 4,722,078 A | * | 1/1988 | Nakanishi et al. ....... 369/30.92 |
| 5,045,327 A | * | 9/1991 | Tarlow et al. .............. 704/270 |
| 5,483,586 A | | 1/1996 | Sussman |
| 5,850,433 A | | 12/1998 | Rondeau |
| 5,923,736 A | * | 7/1999 | Shachar ................... 379/93.17 |
| 5,933,811 A | | 8/1999 | Angles et al. |
| 5,937,390 A | | 8/1999 | Hyodo |
| 5,974,398 A | * | 10/1999 | Hanson et al. ................. 705/14 |
| 5,996,006 A | * | 11/1999 | Speicher ...................... 709/218 |
| 6,009,398 A | * | 12/1999 | Mueller et al. ............. 704/275 |
| 6,035,018 A | * | 3/2000 | Kaufman ................. 379/88.17 |
| 6,249,576 B1 | * | 6/2001 | Sassin et al. .......... 379/218.01 |
| 6,256,620 B1 | * | 7/2001 | Jawahar et al. ................. 707/2 |
| 6,272,278 B1 | * | 8/2001 | Takahata et al. .............. 386/46 |
| 6,301,342 B1 | * | 10/2001 | Ander et al. ........... 379/114.13 |
| 6,321,256 B1 | * | 11/2001 | Himmel et al. ............. 709/218 |
| 6,337,858 B1 | * | 1/2002 | Petty et al. .................. 370/356 |
| 6,341,304 B1 | * | 1/2002 | Engbersen et al. ......... 709/203 |
| 6,374,237 B1 | * | 4/2002 | Reese ............................ 707/3 |
| 6,396,907 B1 | * | 5/2002 | Didcock .................. 379/88.17 |
| 6,493,437 B1 | * | 12/2002 | Olshansky ............. 379/114.13 |
| 6,628,314 B1 | * | 9/2003 | Hoyle ........................ 345/854 |
| 2001/0048737 A1 | * | 12/2001 | Goldberg et al. ...... 379/114.13 |

FOREIGN PATENT DOCUMENTS

| | | | |
|---|---|---|---|
| EP | 0 952 723 | 10/1999 | |
| EP | 1047251 A2 | * 10/2000 | ............ H04M/1/65 |
| WO | WO 99/55066 | 10/1999 | |

\* cited by examiner

*Primary Examiner*—William Cuchlinski
*Assistant Examiner*—Yemane M. Gerezgiher
(74) *Attorney, Agent, or Firm*—Baker Botts L.L.P.

(57) ABSTRACT

A system and method are disclosed in which an initiating caller using a station connected to a data network receives advertisement information while waiting for a call to complete between the station and the receiving party. The station connects with a server that can access a database storing a plurality of advertisement information. The station includes a user interface, which allows the caller to interact with the station, and a flow controller, which monitors the bandwidth available to receive information from the server system.

32 Claims, 12 Drawing Sheets

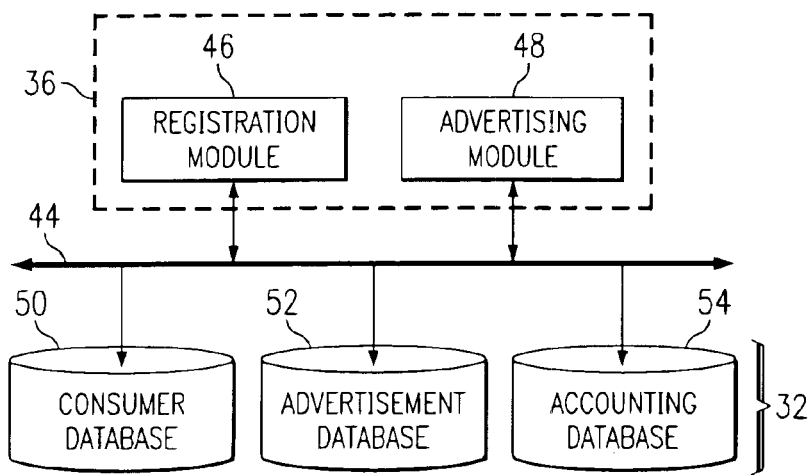
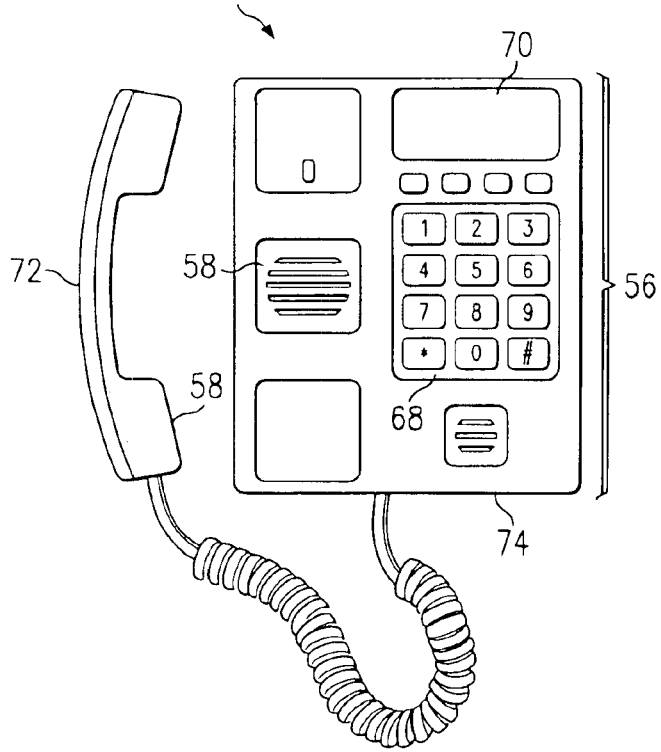

| GENDER (1=MALE; 2=FEMALE) | AGE GROUP (1=0-11 YEARS; 2=12-20 YEARS; 3=21-35 YEARS; 4=36-50 YEARS; 5=50-65 YEARS; 6=OVER 65 YEARS) | ANNUAL INCOME (1=$0-$25,000; 2=$25,001-$40,000; 3=$40,001-$65,000; 4=$65,001-$85,000; 5=OVER $85,000) | HOBBY/INTEREST (1=STOCK MARKET; 2=SPORTS SCORES; 3=FASHION; 4=DINING OUT; 5=MUSIC) | CONSUMER PROFILE | CONSUMER CODE |
|---|---|---|---|---|---|
| 1 | 2 | 1 | 2 | 1212 | 0018783902 |
| 1 | 6 | 3 | 1 | 1631 | 0186532497 |
| 2 | 2 | 5 | 4 | 2253 | 2380001127 |
| 1 | 3 | 4 | 3 | 1344 | 0000488925 |
| ooo | ooo | ooo | ooo | ooo | ooo |
| 2 | 5 | 4 | 4 | 2541 | 1095600488 |
| ooo | ooo | ooo | ooo | ooo | ooo |

(56 kbps, CONNECTION RATE)−
(12 kbps, VOICE COMMUNICATION)−
(14 kbps, SAFETY MARGIN)=
30 kbps, AVAILABLE BANDWIDTH

| MEMORY LOCATION | AVAILABLE TO STORE NEW ADS? | ADVERTISEMENT | LAST PLAYED | PLAY AD FOR WHICH CONSUMER PROFILES? (*=WILDCARD, OR PLACEHOLDER) | NUMBER OF TIMES PLAYED | CONSUMER CODES |
|---|---|---|---|---|---|---|
| 1 | Y | 0884487753 | 8-04-00; 9:05:01am | 1 2 * * | 2 | 0018783902 1554896770 |
| 2 | N | 0001589643 | | 2 2 * 3 | 0 | |
| 3 | Y | 0000879041 | 8-05-00; 3:14:56p | 2 * * 4 | 3 | 2380001127 1095600488 0008749554 |
| 4 | Y | 1986247730 | 8-02-00; 3:14:16p | 2 * * 4 | 2 | 2380001127 0008749554 |
| 5 | N | 1001197834 | | 1 4 * 2 | 0 | |
| 6 | Y | 0532130784 | 8-11-00; 12:32:55p | * 2 * * | 1 | 0018783902 0186532497 |
| 7 | Y | | | | | |
| ○ ○ ○ | ○ ○ ○ | ○ ○ ○ | ○ ○ ○ | ○ ○ ○ | ○ ○ ○ | ○ ○ ○ |

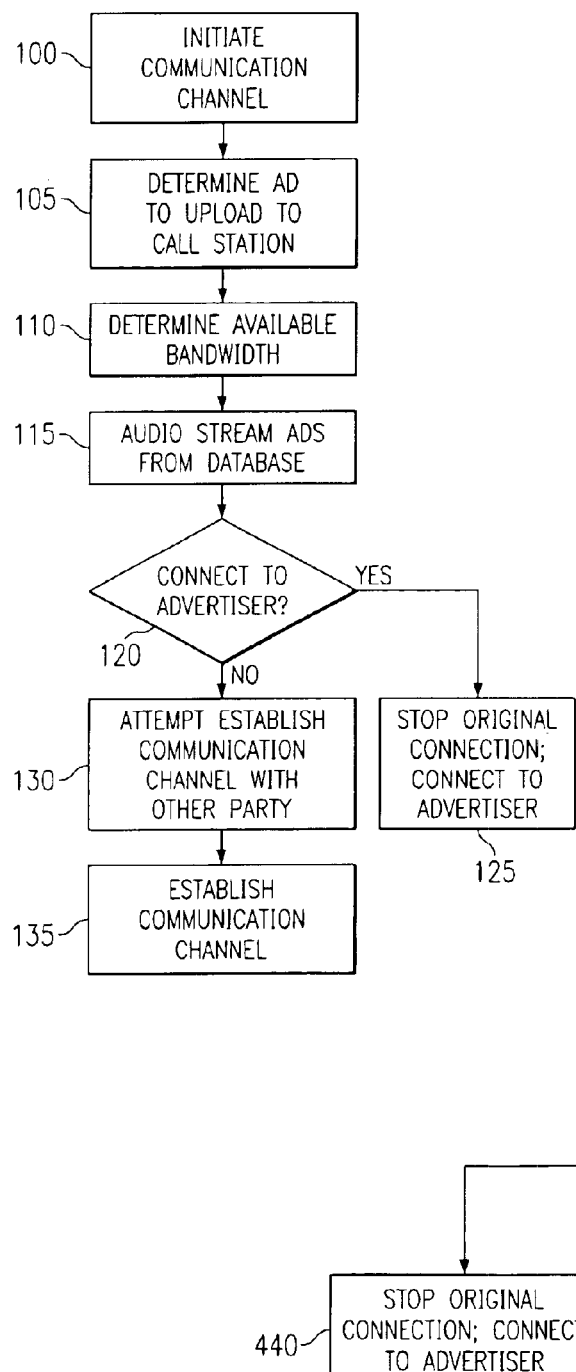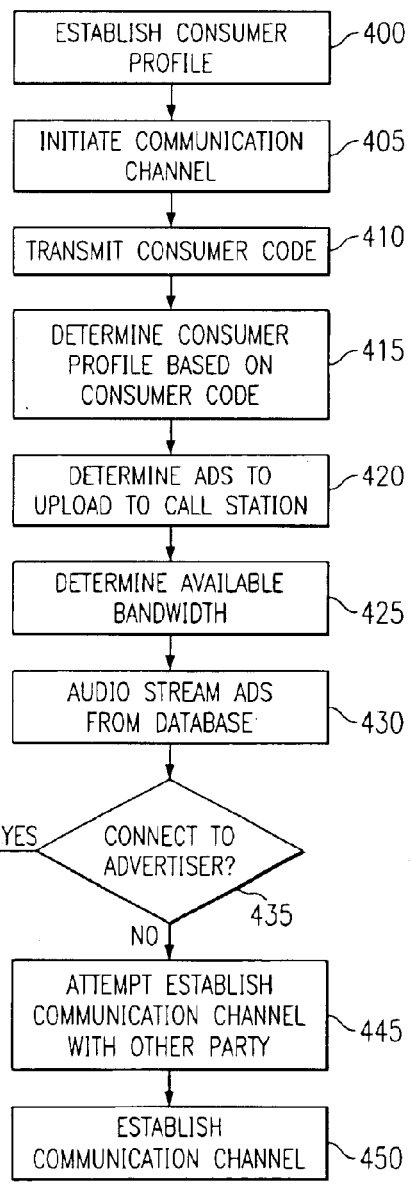

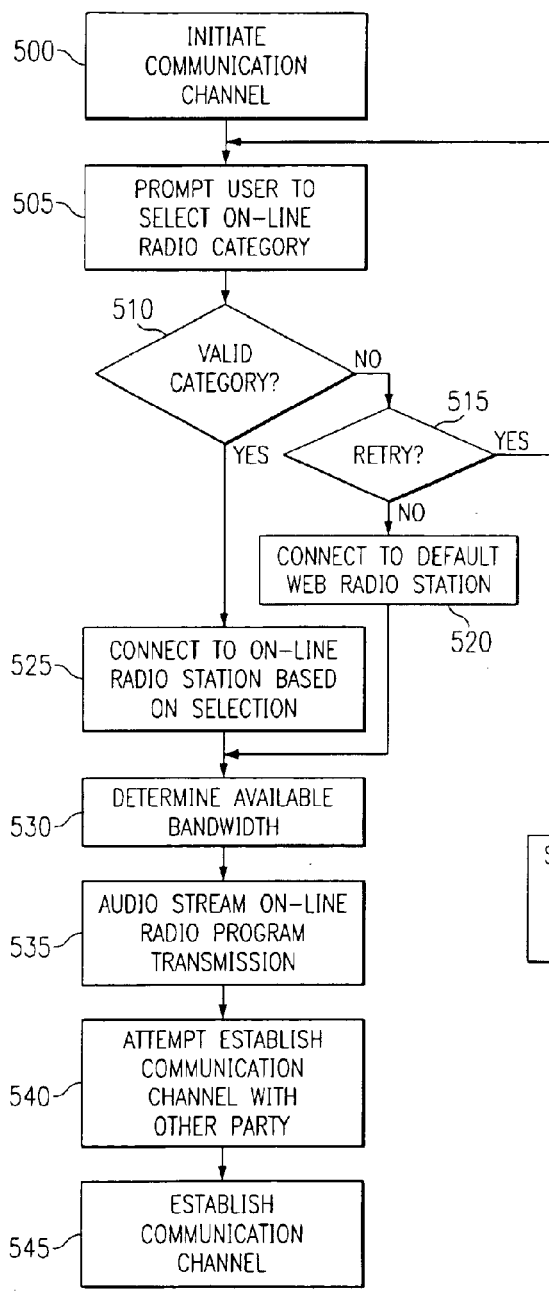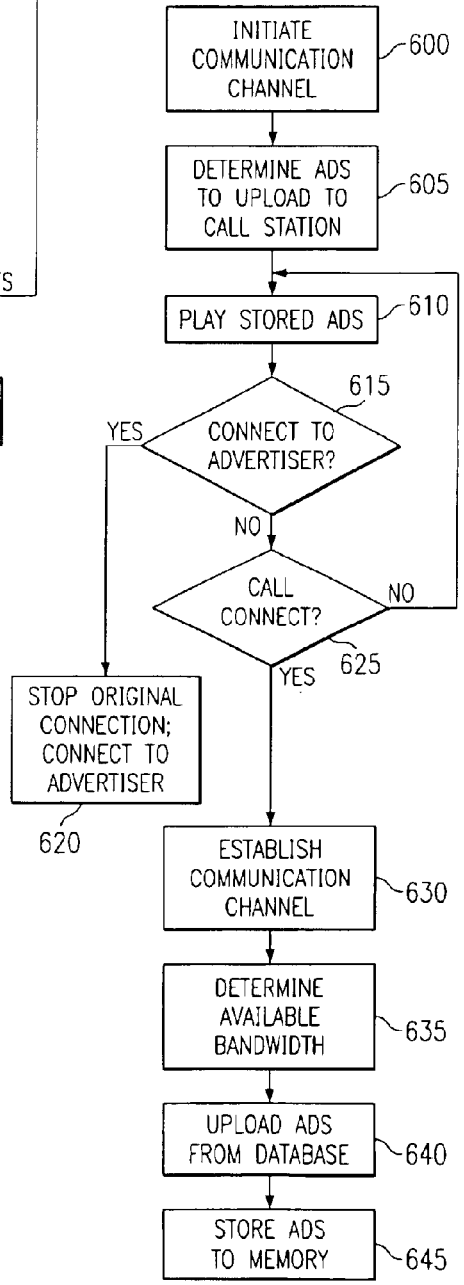

SYSTEM AND METHOD FOR PROVIDING ON-LINE ADVERTISING AND INFORMATION

RELATED APPLICATIONS

This application claims priority to U.S. Provisional Patent Application entitled "A System and Method For Providing Voice Communication Over Data Networks", Ser. No. 60/161,168, filed on Oct. 22, 1999, and U.S. patent application entitled "A Method and System for Providing Voice Communication Over Data Networks", Ser. No. 09/543,381, filed on Apr. 5, 2000, the entire contents of which are incorporated herein by reference.

BACKGROUND OF THE INVENTION

1. Field of the Invention

The invention relates to a system and method for providing advertising about products and services over data networks.

2. Brief Description of the Related Art

Networks carry three types of information: voice, video, and data Historically, these different forms of information have been transported over different networks. Specifically, the public switched telephone network (PSTN) delivered voice information; private corporate networks delivered data information; and broadcast networks delivered video information. Each service was provided by a specific form of infrastructure the PSTN used copper wires to reach subscribers, broadcast television used the airwaves, cable television used coaxial cable, and so forth.

With advances in technology, the different forms of information can now be carried by any delivery platform. For example, telephony services (i.e., voice and facsimile) can be transported over packet-switched networks, such as the Internet. "Internet telephony" refers to the transfer of voice information using the Internet protocol (IP) of the TCP/IP or UDP/IP protocol suite. Internet telephony uses the Internet to simulate a telephone connection between two Internet users and to bypass the local exchange carriers' and inter-exchange carrier's telephone networks. Internet telephony works by converting voices into data that can be compressed and split into packets. These data packets are sent over the Internet like any other packets and reassembled as audio output at the receiving end. The ubiquitous nature of the Internet allows a user to complete such Internet telephone connections to many countries around the world. Accordingly, by using the Internet to provide telephony services, the user can avoid paying per-minute toll charges assessed by the user's local exchange carrier and/or inter-exchange carrier. Rather, the user is subject to only his or her local Internet connection fees. The result may be considerable savings when compared to international telephone rates.

When conducting an Internet telephone call, most existing dial-up systems require both parties to be connected to the Internet through a multimedia personal computer. During the connection time, conventional on-line advertisement systems provide connected users with web advertisement, typically graphical images or banners which display on and/or scroll across the computer screen while the user visits or browses a web site. However, this type of on-line advertising is limited since the user must be using a multimedia personal computer to access the on-line system, and such multimedia personal computers are expensive and difficult to set up and maintain. Further, conventional on-line advertisements are visual (e.g., graphical images or banners) and do not include audio content. In addition, much of the on-line advertisement does not specifically target those consumers most likely to use the product or service being offered. Therefore, a tremendous amount of web advertising is wasted on promoting goods or services to an improper audience.

Accordingly, it would be desirable to provide a system and method for providing on-line advertising and information that addresses the drawbacks of known systems.

SUMMARY OF THE INVENTION

The present invention relates to a system and method for providing on-line advertising and information to a user connected to a data network. The system receives and plays the on-line advertising or information while the user waits for an Internet call to be established between the user and the receiving party.

In accordance with one aspect of the present invention, the system includes a database that stores information, a server associated with the database, and a first station that receives and plays back information from the database. The first station includes a flow controller that determines the amount of bandwidth available to receive information from the database and responsively affects the receiving of such information from the database.

In accordance with another aspect of the present invention, a station provides information to a user. The station includes a user interface, for allowing the user to interact with the station, and a storage medium that has stored a plurality of programming modules. The programming modules include a call initialization module, a playback module, and a flow controller.

A further aspect of the invention relates to a method for providing information a user who is connected to a data network. The method includes the steps of establishing a communication channel between a station and a server, identifying information to send to the station from a database, determining the bandwidth available between the station and the server, and receiving information at the station in response to the amount of bandwidth available between the station and the server.

The present invention address the drawbacks of known on-line advertisement systems by not requiring the use of multimedia personal computers to access the advertisement information and by providing audio content to the on-line information. In addition, the present invention plays the on-line information to an interested audience.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 3 is a block diagram of the memory unit of the database server of FIG. 2;

FIG. 4 illustrates stored data in a consumer database;

FIG. 5 is a perspective view of one embodiment of an Internet device;

FIG. 10 is a flowchart showing a first and preferred embodiment of a method of providing on-line advertising to the Internet device of FIG. 5;

FIG. 13 is a flowchart showing a fourth and alternative embodiment of the method of providing on-line advertising;

FIG. 14 is a flowchart showing a fifth and alternative embodiment of the method of providing on-line advertising;

FIG. 15 is a flowchart showing a sixth and alternative embodiment of the method of providing on-line advertising;

DETAILED DESCRIPTION OF THE PREFERRED EMBODIMENTS

Figure 1:
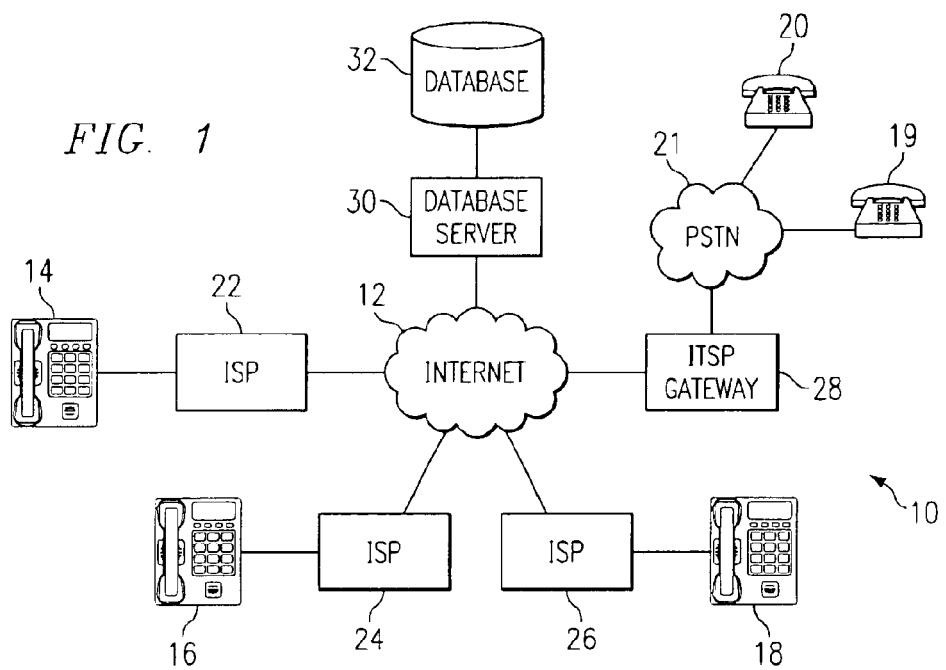
FIG. 1 illustrates an Internet telephone call system according to the present invention.

FIG. 1 illustrates one configuration of an Internet telephone call system 10. The Internet telephone call system 10 transports voice over a packet-switched network 12, such as the Internet, using data packets whereby an Internet subscriber (hereinafter "subscriber" and not shown) having the necessary hardware and software may conduct real-time voice conversations over the Internet 12. The Internet devices or Internet telephones 14, 16, 18 forming the Internet telephone call system 10 may include a conventional telephone and an adaptor having Internet telephony enabling hardware and software, e.g., the Komodo Fone™ product available from Komodo Technology, Inc. of Los Gatos, Calif. An alternative embodiment of the Internet device has the telephone and adaptor integrated, and it may provide video and other services. Further, the Internet telephones 14, 16, 18 can place calls via a gateway 28 to regular, analog telephones 19, 20 connected to the PSTN 21. Although the Internet telephone call system 10 is illustrated as including telephonic devices, it will be apparent to persons skilled in the art that the present invention can support multimedia audio-visual applications without departing from the scope of the present invention.

As shown in FIG. 1, the Internet telephone call system 10 includes at least two Internet devices 14, 16, 18 each connecting through an associated central office (not shown) and Internet Service Provider (ISP) 22, 24, 26 in order to access the Internet 12. A database server 30 and an associated database 32, connected to the server 30 by a communication link, can communicate with the Internet devices 14, 16, 18. Specifically, the database server 30 delivers information to the Internet devices 14, 16, 18 and interprets requests or queries for retrieval from the database 32. Although any Internet telephone 14, 16, 18 can initiate or receive an Internet telephone call or PSTN telephone call, for illustrative purposes only, it will be assumed that the subscriber using the Internet device 14 will be the initiating caller, and the subscriber using the Internet CONFIDENTIAL device 16 will be the receiving party. Moreover, the Internet devices 14, 16, 18 can use dial-up modems, cable modems, Ethernet connections, or the like to connect to the central offices and then access their associated ISPs.

Figure 2:
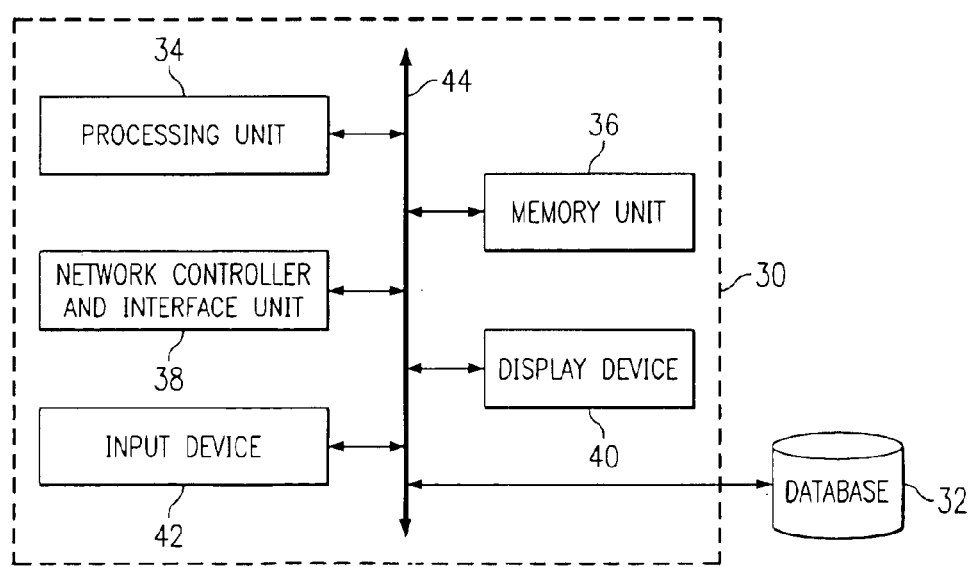
FIG. 2 is a block diagram of the hardware architecture of the database server.

The initiating caller, or user, may cause the Internet device 14 to place a telephone call over the Internet 12 by connecting to the Internet and then connecting to the receiving party's Internet device 16. The time required to connect the Internet device 14 with the ISP 22 and then the receiving party 16 may be as long as two minutes, depending on the network traffic conditions. With conventional Internet telephony systems, the user hears "dead air" or various noises while waiting for a connection to establish between the Internet device 14 and the ISP 22 and then the receiving Internet device 16. According to one embodiment of the invention, advertisements or other information pre-stored at the Internet device 14 are played to the initiating caller during the connection process to alleviate the boredom and silence., More specifically and as illustrated in FIG. 2, the database server 30 includes a processing unit 34, a memory unit 36, a network controller and interface 38, a display device 40, and an input device 42. The processing unit 34, which may be, for example, a personal computer commercially available from Hewlett-Packard Co., communicates with the various elements via a system bus 44. The database server 30 operates under the control of an operating system, such as the well-known UNIX operating system.

The memory unit 36 communicates with the database 32 that stores, among other things, advertisement information, accounting and billing information, and individual user and/or consumer profiles. Those skilled in the art will appreciate that storing, updating, and replacing information at the multiple databases coupled with a server 30 is within the scope of the present invention. Updates to the database 32 can be performed using the input device 42. Further, the advertisements stored in the database 32 can be categorized such that while the subscriber waits to connect with the other party, advertisements directed toward that user's consumer profile are played, as will be described in greater detail below.

As shown in FIG. 3, the memory unit 36 includes a registration module 46 and an advertising module 48, both described in detail below.

The database 32 includes, for example, a consumer database 50, an advertisement database 52, and an accounting database 54. The consumer database 50 is used for storing consumer information while the advertisement database 52 contains a wide variety of advertisement information for products and services directed towards a wide range of consumers. The accounting database 54 stores advertisement audit information, for example, which advertisements are played to consumers and how often each advertisement is played. The database 32 may further comprise a music database, stock market database, and/or sport scores database, although not shown.

In one embodiment, the user inputs the other party's number, such as a telephone number, IP address, email address, or the like, at the Internet device 14 to establish a communication channel with the other party over the Internet 12. While attempting to establish such a communication channel, the Internet device 14 plays, for example, advertisements pre-stored at the Internet device 14. After connecting with the associated, ISP 22, the Internet device 14 can register with the registration module 46 and request the database server 30 to upload new information to the Internet device 14.

In accordance with another embodiment, the user enters personal information at the Internet device 14, such as age, sex, income, hobbies, consumer preferences or last purchases, and other information, which is sent to the registration module 46. Upon proper completion of the questions, the registration module 46 generates a consumer profile of the user and a consumer code associated with that consumer profile, both of which can be stored, for example, in tabular form at the consumer database 50, as shown in FIG. 4. Then to place a call using the Internet device 14, the user must first enter his consumer code or number, or he must help generate a new consumer profile and consumer code or number. Before the Internet device 14 establishes a communication channel with the receiving party, advertisements directed toward that user's consumer profile are played to the caller.

In another embodiment, the consumer profile and consumer code or number are previously stored in the consumer database 50. The consumer code or number can also be stored on a calling card, smart card, or the like which the user inserts or swipes into the Internet device 14 to activate the device and place a call. By activating the Internet device 14 with the calling card, the Internet device and the registration module 46 can receive the consumer code. The registration module 46 then automatically searches the consumer database 50 using the consumer code and associates the user with the appropriate, pre-stored consumer profile.

In yet another embodiment of the present invention, a consumer profile is not generated. Rather, the Internet device 14 prompts the user to input the category of goods or services of greatest interest to him or her. Accordingly, the advertising module 48 will cause the appropriate advertisements from the advertisement database 52 to upload to the Internet device 14.

The advertisement database 52 contains numerous advertisements for different goods or services. By using the input device 42, the advertisement database 52 can be updated with new or different advertisements, as well as remove advertisements. In one embodiment, the different goods and services are organized in the advertisement database 52 by various categories that can be defined by the advertisement provider. For example, the advertisement categories may include, but are not limited to, sporting goods, automobiles, dining, clothing, and jewelry. Then based on the user's consumer profile, accessible via the registration module 46, the advertising module 48 determines which advertisements contained in the advertisement database 52 are directed toward that consumer profile. A pointer to the database location storing the information identifies which advertisement was last uploaded to the Internet device 14.

Accordingly, the advertising module 48 causes the advertisement database 52 to send those relevant advertisements to the Internet device 14. If the advertisement database 52 does not presently contain advertisements directed toward a particular consumer profile, the database sends default advertisements or advertisements based on predetermined criteria, for example, advertisement provider agreements, popularity or frequency of advertisement playback, which advertisements are currently stored at the Internet device 14, or bandwidth availability (i.e., sending shorter length advertisements when network traffic is high). Further, the advertisements may include a telephone access number that connects to the advertiser, whereby a user desiring additional information about a good or service causes the Internet device 14 to terminate the call with the original receiving party and redirect the call to the advertiser using that access number. Alternatively, the redirected call connects the user to a server system that provides the additional information concerning the good or service.

The accounting database 54 can perform billing and auditing operations, such as tracking which advertisements have been uploaded to the Internet devices, how often each advertisement was requested, and the number and type of advertisements a particular consumer has heard. The accounting database 54 receives such information via the advertising module 48. By using the information contained in the accounting database 54, advertisers can be billed based on the actual delivery of the advertisements to interested consumers and on how often a targeted consumer group listens to such advertisements. Moreover, the advertisers can determine the effectiveness of the on-line advertisements based on the number of calls received using the telephone access numbers.

Figure 6:
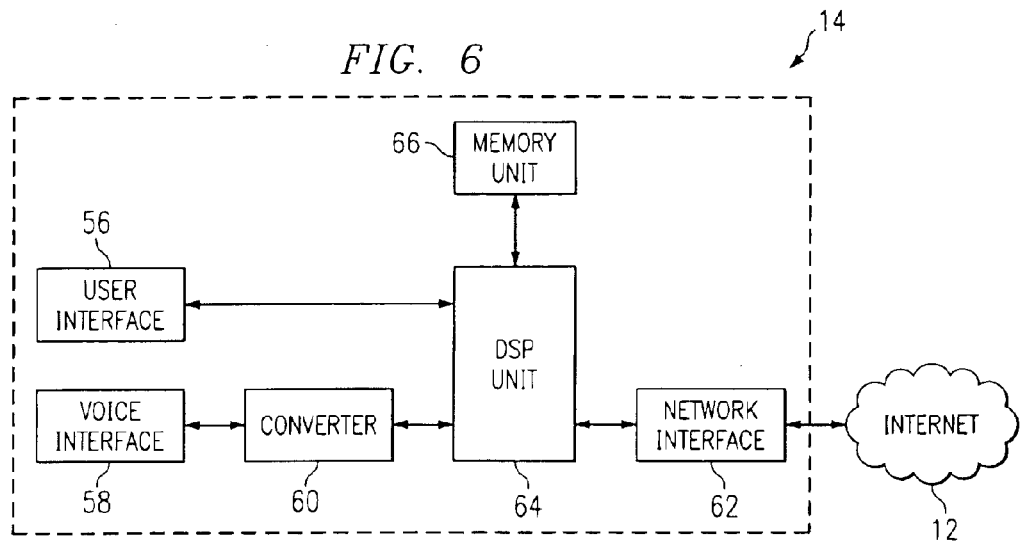
FIG. 6 is a block diagram of the Internet device of FIG. 5.

FIG. 5 shows one embodiment of the Internet telephone 16, and FIG. 6 depicts the basic components of the Internet device 14. As illustrated in FIGS. 5 and 6, the Internet device 14 includes a user interface 56, a voice interface 58, a converter 60, a network interface 62, a digital signal processor unit 64 and associated logic, and a memory unit 66. The Internet device 14 can perform various voice over Internet functions, such as scanning, voice compression, data packetization, and network interfacing.

The user interface 56 allows a user to interact with the Internet device 14. The user interface 56 includes, among other features, a keypad 68 for dialing numbers or activating certain call functions and an audible indicator for indicating operating characteristics and/or instructions, such as new telephone messages, the call status, or selectable options from a telephonic voice menu, including available call features. Although the Internet device is shown as having a keypad 68 for inputting commands or responding to questions, it will be understood that the Internet telephone 14 may also use voice or video activation. The user interface 56 may also include a visual display 70 for displaying such operating characteristics.

The voice interface 58, in accordance with conventional practice, is a speaker and/or microphone located on the telephone handset 72 and/or base 74. Speech signals from the microphone 58 are transmitted to a converter 60 (shown in FIG. 6) that provides the conversion of analog voice into digital signals. Specifically, the analog voice is digitized, by means commonly known in the field, and the digital data are transmitted to a digital signal processor unit 64 (DSP unit shown in FIG. 6) that provides call processing and voice processing.

The network interface 62 allows transmission and reception of voice packets to and from the Internet device 14. For example, the Internet device 14 has telephone, LAN, and/or Ethernet connectivity.

The DSP unit 64 and associated logic are supported by voice processing software and a memory unit 66, described in detail below. The DSP unit 64 includes a digital signal processor and other control processing units. The DSP unit 64 performs call signaling and control, voice compression and decompression, and packetization and depacketization functions.

The memory unit 66 includes programmable and dynamic memory, such as electrically erasable programmable read-only memory (EEPROM) and dynamic random access memory (DRAM) devices. The memory unit 66 stores the advertising algorithms (described in greater detail below) which the DSP unit 64 follows, as well as provides temporary storage of incoming advertisements not yet processed by the DSP. In addition, the consumer code or number, as described above, is stored in the memory unit 66.

Figure 7:
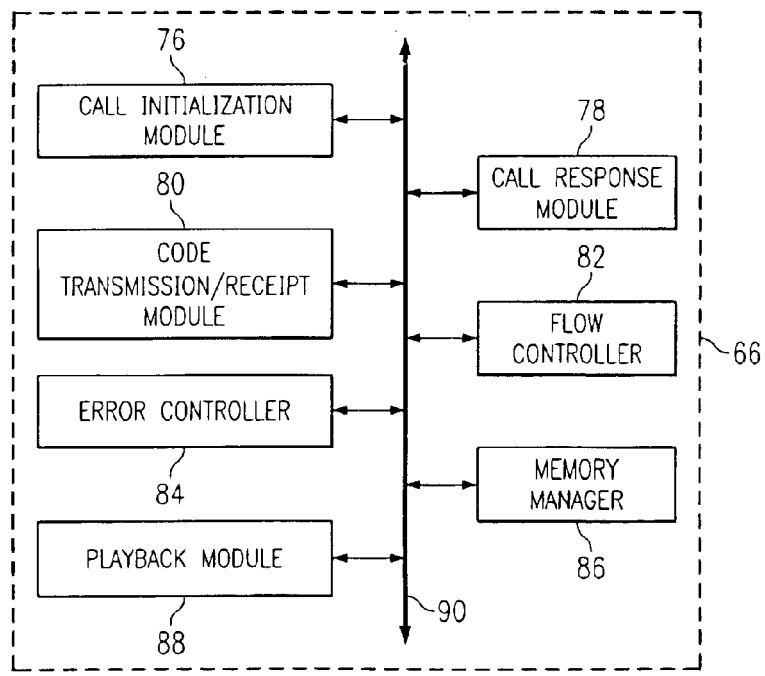
FIG. 7 is a block diagram of the memory unit of the Internet device of FIG. 5.

As illustrated in FIG. 7, the memory unit 66 includes a call initialization module 76, a call response module 78, a code transmission/receipt module 80, a flow controller 82, an error controller 84, a memory manager 86, and a playback module 88. The memory unit 66 communicates with the various elements via a system bus 90. Moreover, the memory unit 66 operates under the control of an operating system that allows the memory unit to perform multiple tasks, simultaneously.

The call initialization module 76 performs the function of initiating a call to the receiving party at the second Internet device 16. The call response module 78 of the first Internet device 14 can then determine whether a connection has been established between the parties.

The code transmission/receipt module 80 automatically transmits the consumer code or number, if available, to the registration module 46.

The flow controller 82 determines the available bandwidth to the Internet device 14' and controls the flow of information received at the Internet device. Specifically, the flow controller 82 determines the connection rate between the Internet device 14 and its associated ISP 22 and subtracts the amount of bandwidth required to support a communication-channel between the first and second Internet devices 14, 16. The bandwidth required to support a communication channel between the Internet devices 14, 16 depends upon the audio compression/decompression (codec) technique, e.g., G.711, G.723.1, or G.729A, being employed. The flow controller 82 will also consider the network traffic conditions, for example, when the network load is too high, the flow controller 82 can signal the advertising module 48 not to send any advertisement information until the network traffic decreases to an acceptable level.

Figures 8, 9:
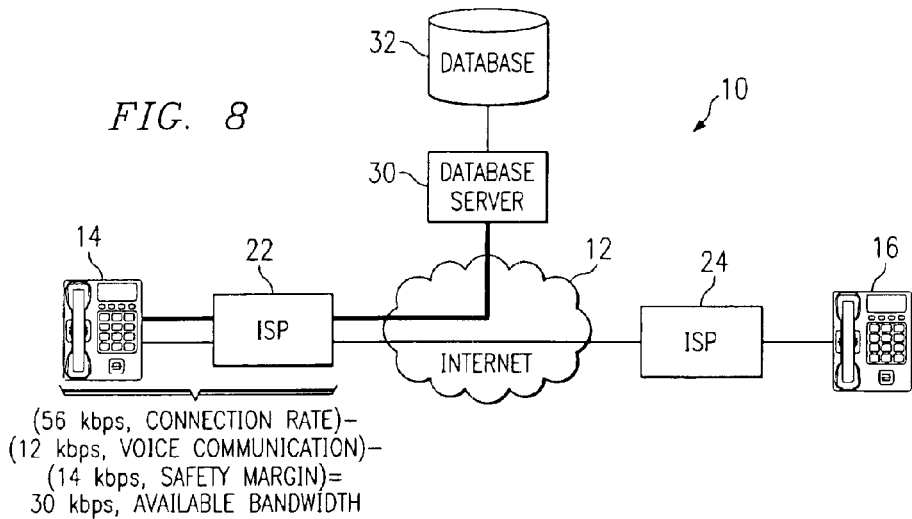
FIG. 8 is a partial view of the Internet telephone call system of FIG. 1, showing the available bandwidth between the Internet device and an associated Internet service provider.
FIG. 9 illustrates stored data in a memory manager.

For example, and as illustrated in FIG. 8, the connection rate between the first Internet device 14 and its associated ISP 22 is 56 kilobytes per second (kbps). Assuming that the first and second Internet devices 14, 16 communicate using 12 kbps and that a safety margin, or "cushion," of 14 kbps is desired, the flow controller 82 would determine that 30 kbps bandwidth is available to receive advertisement information at the Internet device 14 while supporting the conversation with Internet device 16. Then by continuously monitoring the bandwidth availability between the first and second Internet devices 14, 16, the flow controller 82 can control the flow of advertisement information upload to the Internet device 14 and thereby affect the efficiency of transmitting information.

The error controller 84 determines whether the Internet device 14 correctly received the advertisement information data packets. If the error controller 84 determines that the received advertisement data packets are not complete or contain errors, the error controller can cause the advertising module 48 to re-transmit the required advertisement information data packets to the Internet device 14. Such re-transmission typically occurs when the Internet device 14 is not streaming audio and/or video data packets, as described in detail below. Moreover, if the error controller 84 determines that the received advertisement information data packets contain errors or are incomplete, those data packets will not be moved from temporary memory area to permanent memory. Rather, the memory manager 86 will flag the temporary memory space as available for overwriting.

The memory manager 86 manages the allocating and freeing of memory space in the memory unit 66. For example, and as shown in FIG. 9, in performing this function, the memory manager 86 tracks which advertisement information is stored in the memory unit 66, which advertisement information has been played, and how much memory space is available to store new advertisement information. Based on this information, the memory manager 86 determines where to store uploaded advertisement information whet her to overwrite memory space (e.g., memory locations 1, 3, 4, and 6) or save to unused memory space (e.g., memory location 7). In addition, the memory manager 86 tracks the categories of advertisement information stored in the memory unit 66 and operates with the advertising module 48 in determining which new information to upload to the Internet device 14. These steps prevent repeat advertisements from being stored at the memory unit 66, as well as ensures that a broad range of advertisements are available for playback. The memory manager 86 also operates with the flow controller 82 to avoid uploading advertisement information when memory space is insufficient. Additionally, the memory manager 86 arranges or prioritizes the advertisement information in memory unit 66 for determining in what order to playback the advertisement. For example, the memory manager 86 selected the advertisement in memory location 3 to play more frequently than the advertisement in memory location 4, although both satisfy the same consumer profile criteria.

The playback module 88 plays back the advertisement information stored in the "permanent memory" of the memory unit 66 in an order arranged by the memory manager 86. For example, to a user having the consumer profile of "2344" (reference FIGS. 4 and 9), the playback module 88 will play advertisement information at memory location 4 before replaying memory location 3, since location 3 was more recently played. It is within the scope of the invention that the playback module 88 streams the audio and/or video advertisement information.

Further, while the Internet device 14 in FIGS. 5 and 6 combine the user and voice interfaces 56, 58, the converter 60, network interface 62, the DSP unit 64 and associated logic, and the memory unit 66 into a single device, one skilled in the art will appreciate that such components can be combined or separated on distinct devices without significantly affecting the functionality of the Internet device.

In operation, while the Internet device 14 attempts to connect with the Internet 12 and then with the receiving party at Internet device 16, the Internet device 14 plays advertisement information already stored at the memory unit 66. After establishing a communication channel between the Internet devices 14, 16, the parties can conduct their conversation. During this conversation, the Internet device 14 receives new advertisement information from the advertisement database 52 and stores it into the memory unit 66 for future playback, as described in greater detail with reference to FIGS. 15–18. In an alternative embodiment, the Internet device 14 connects to the Internet 12 using means such as, but not limited to, an Ethernet connection where generally the Internet device is continuously connected to the LAN or Internet 12. In this embodiment, the Internet device 14 can stream video and/or audio information to the user in real time before establishing the communication channel between the Internet devices 14, 16, as described in greater detail with reference to FIGS. 10–14.

With reference to FIG. 10, a flow diagram illustrates an exemplary embodiment of a method for directing advertisement information over the Internet 12 to a user. Here, the Internet device 14 can perform audio and/or video streaming whereby advertisement information uploaded from the advertisement database 52 is buffered at the Internet device 14. Specifically, the incoming advertisement information from the advertisement database 52 is temporarily stored in the jitter buffer for a specified amount of time before sending or playing them in a more uniform stream.

Initially, at block 100, the initiating caller, or user, places a call to the receiving party at the second Internet device 16. The call response module 78 of the first Internet device 14 can then determine whether a connection has been established between the parties. At block 105, the flow controller 82 transmits a signal to the advertising module 48 to identify advertisement information to send to the Internet device 14. The advertising module 48 identifies the advertisement information to upload to the Internet device 14 based on predetermined criteria, for example, the next sequential advertisement stored in the database 52, prioritization of advertisement information based on advertiser agreements, or by random selection. In determining the sequential order of advertisement stored in the database 52, a pointer to the memory location storing the information identifies which advertisement was played last.

At block 110, the flow controller 82 determines the available bandwidth for sending the identified advertisement information to the Internet device 14. In making this determination, the flow controller 82 determines the connection rate, or bandwidth available, from the Internet device 14 to its associated ISP 22. The flow controller 82 will also consider the network traffic conditions. For example, when the network load is too high, the flow controller 82 transmits a signal to the advertising module 48. In response to the signal, the advertising module 48 will not upload advertisement information to the Internet device 14 until the network traffic decreases to an acceptable level. In one embodiment of the invention, the flow controller 82 subtracts an additional, predefined amount of "spare" bandwidth in determining the available bandwidth to receive advertisement information at the Internet device 14.

Next at block 115, the advertisement information identified at step 105 is uploaded to the Internet device 14 from the advertisement database 52, and the playback module 88 will audio stream a predetermined amount of the received advertisement information. By continuously monitoring the bandwidth availability between the first and second Internet devices 14, 16, the flow controller 82 can control the flow of advertisement information uploaded to the Internet device 14 and affect the efficiency of transmitting information. Further, based on the network traffic, as determined by the flow controller 82, the buffer management system (not shown) can adjust the jitter buffer depth to ensure a more uniform playback of the advertisement information.

At decision block 120, the user decides whether to continue waiting for the call to complete or to discontinue the call to the second Internet device 16 and receive additional information concerning the goods or services advertised in the then playing advertisement. If the user wishes to receive additional information, he can input his request via the user interface 56 or the voice interface 58. Then at block 125, the Internet device 14 will terminate the original call establishment process and attempt to connect the user to the advertiser using the telephone access number provided by the advertiser.

If no such request is made, the process moves to block 130 where the Internet device 14 attempts to establish a communication channel between the initiating caller and receiving party. If the receiving party is available, a communication channel can be established between the Internet devices 14, 16, as shown at block 135. Otherwise, the initiating caller is prompted to enter a different telephone number, IP address, email address, or the like, to establish a communication channel with a third party, for example, at Internet device 18 or telephonic device 20. Before the Internet device 14 attempts to establish a communication channel with the third party, the flow controller 82 will determine the available bandwidth, and the playback module 88 will audio stream other advertisement information to the user. The user can cancel or discontinue the call at any time by hanging up the handset 72 or disconnecting the Internet device 14.

Figure 11:
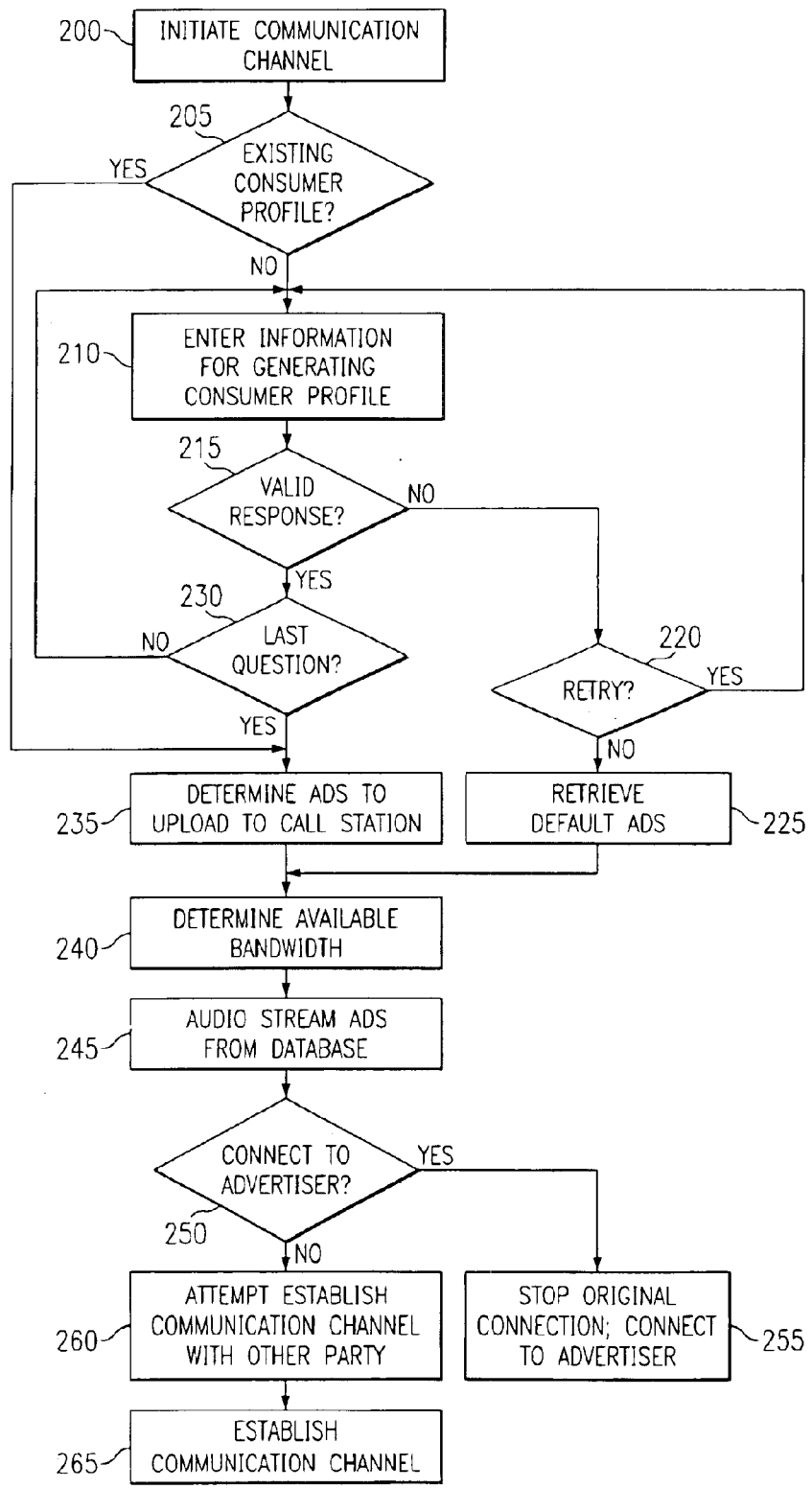
FIG. 11 is a flowchart showing a second and alternative embodiment of the method of providing on-line advertising.

With reference to FIG. 11, an alternative embodiment of the method for directing advertisement information over the Internet 12 to users is described. Here, the Internet device 14 audio and/or video streams advertisement information that is directed toward users based on their consumer profiles, thereby promoting goods and services to an interested audience. The process of FIG. 11 is substantially similar to the method of FIG. 10, except that this alternative embodiment includes the additional steps for generating a consumer profile. The additional steps are described below.

At decision block 205, it is determined whether a consumer profile for the initiating caller already exists at the consumer database 50. For example, this determination may be made by prompting the user to enter a consumer code or number corresponding to the consumer profile previously assigned to that user, as described in greater detail below. If the registration module 46 determines that the user entered a valid consumer code, the process flows to block 235 where the advertising module 48 identifies advertisement information directed toward that user's consumer profile. Otherwise, the Internet device 14 prompts the user to provide a wide variety of information for generating a consumer profile, as shown at block 210. The user enters his or her responses into the Internet device 14 by using the user interface 56 or the voice interface 58.

At decision block 215, it is determined whether the user properly responded at block 210. If not, the process flows to the decision block 220 where it is determined whether to prompt the user to re-enter a response. If the answer to the decision block 220 is no, the process flows to block 225 where the flow controller 82 sends a signal to the advertising module 48 to send advertisement information to the Internet device 14 based on predetermined criteria, such as the next sequential advertisement stored in the database 52, prioritization of advertisement information based on advertiser agreements, or by random selection. Otherwise, the scheme loops back to block 210 where the user is re-prompted to enter information. For example, the process can loop back to block 210 a predetermined number of times before the flow controller 82 automatically signals the advertising module 48 to send the default advertisement information to the Internet device 14.

If the answer to decision block 215 is yes, the scheme flows to block 230 where it is determined whether the user has responded to the last question or provided all of the required information for generating a consumer profile. If there are unanswered questions or additional information is required, the process loops back to block 210, and the Internet device 14 prompts the user to enter additional responses. Otherwise, the registration module 46 generates a consumer profile of the user that is stored in the consumer database 50. A consumer code or number corresponding to the generated consumer profile is assigned and conveyed to the user so for future uses of the Internet device 14, the user can enter his or her consumer code and bypass the steps 210 through 230.

Figure 12:
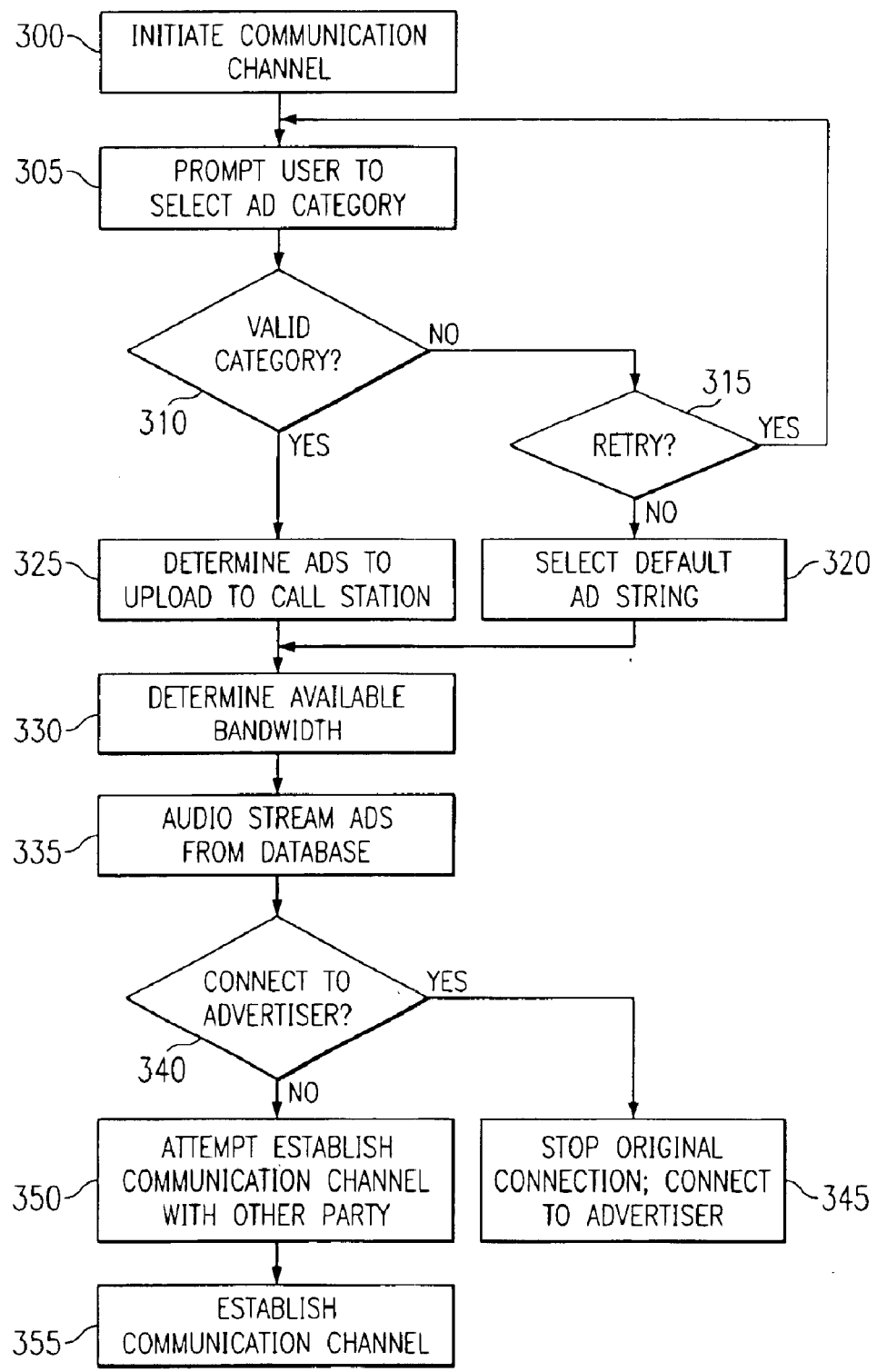
FIG. 12 is a flowchart showing a third and alternative embodiment of the method of providing on-line advertising.

With reference to FIG. 12, in a further alternative embodiment of the on-line advertisement system, the process is substantially similar to the method of FIG. 10, except that this further alternative embodiment includes additional steps for playing advertisements based on advertisement categories. The additional step are described below.

At block 305, the user is prompted to select from a list of predetermined advertising categories. Next at decision block 310, it is determined whether the user selected a valid advertising category. If not, the process flows to the decision block 315 where it is determined whether to prompt the user to re-select from the list of predetermined advertising categories. If the answer to the decision block 315 is no, the process flows to block 320 and the flow controller 82 sends a signal to the advertising module 48 to upload default advertisement information to the Internet device 14 based on predetermined criteria. Otherwise, the scheme loops back to block 305 where the user is re-prompted to select from the list of advertising categories. For example, the process will loop back to block 305 a predetermined number of times before the flow controller 82 automatically signals the advertising module 48 and causes it to send the default advertisement information to the Internet device 14.

If the answer to decision block 310 is yes, the scheme flows to block 325 where the flow controller 82 sends a signal to the advertising module 48. In response to the signal, the advertising module 48 identifies advertisement information from the advertisement database 52 that is within the advertisement category inputted at step 305. Next at block 330, the flow controller 82 determines the available bandwidth for sending the identified advertisement information to the Internet device 14. The flow controller 82 uses a method substantially similar to the method described for FIG. 10.

With reference to FIG. 13, in yet a further alternative embodiment of the on-line advertisement system, the process is substantially similar to the method FIG. 10, except that this alternative embodiment includes additional steps for establishing and using consumer profiles to identify appropriate advertisement information. The additional steps are described below.

At block 400, users establish their own personal consumer profiles that are stored at the consumer database 50. For example, each user enters a wide variety of information, as described above, via the user interface 56 or voice interface 58 to the Internet device 14. This information is sent to the registration module 46 for generating a personal consumer profile. Each consumer profile has an associated consumer code or number that the advertising module 48 uses to identify the types of products and services (i.e., advertisement information) mostly likely to interest a particular user. Such consumer code is also stored at the consumer database 50 and the memory unit 66 of the Internet device 14.

At block 405, the initiating caller uses the Internet device 14 to place a call with the receiving party at Internet device 16. For example, the initiating caller may use a calling card, smart card, or the like to active the Internet device 14 and place a call. By activating the Internet device 14 using the card, the consumer profile is automatically provided to the Internet device via the consumer code stored at the card. The initiating caller may also provide the consumer code via the user interface 56 or voice interface 58 to activate the Internet device 14. Then at block 410, the code transmission/receipt module 80 automatically transmits the consumer code to the registration module 46.

After receiving the consumer code, at block 415, the registration module 46 at the database server 30 searches the consumer database 50 and maps the user's consumer code with the previously stored consumer profile. As shown at block 420, based on the user's consumer profile, the advertising module 48 determines which advertisement(s) in the advertisement database 52 are directed toward that consumer profile. Then the memory manager 66 and flow controller 82 determine the order in which to upload the advertisement information to the Internet device 14. For example, this prioritization is based on which advertisements are currently stored at the Internet device 14 (i.e., avoid repeat advertisements stored at the device), the amount of available bandwidth between the Internet device 14 and its associated ISP 22 (i.e., if network traffic is high, sending shorter advertisements), and other criteria.

Next at block 425, the flow controller 82 determines the available bandwidth to upload the advertisement information to the Internet device 14; and at block 430, the playback module 88 of the Internet device 14 audio streams a predetermined number of received advertisement information. By continuously monitoring the bandwidth availability between the first and second Internet devices 14, 16, the flow controller 82 can control the flow of advertisement information uploaded to the Internet device 14 and thereby affect the efficiency of transmitting information.

As illustrated in FIG. 14, another embodiment of the on-line advertisement system, the user is prompted to select an on-line radio or multicasting category, including, but not limited to, sports scores, news updates, music programs, stock quotes, movie previews, or the like. Based on the user's selection, the Internet device 14 receives audio and/or video broadcasting while waiting for the communication channel with the receiving party at Internet device 16 to be established. For illustrative purposes only, it will be assumed that the information streamed to the Internet device 14 will be on-line radio programs.

At block 500, the initiating caller at Internet device 14 places a call to the receiving party at Internet device 16. Then at block 505, the Internet device 14 prompts the user to select from a list of predetermined on-line radio programming, as described above. The user can input his or her selection to the Internet device 14 by using the user interface 56 or the voice interface 58.

At decision block 510, it is determined whether the user selected a valid on-line radio programming category. If not, the process flows to the decision block 515 where it is determined whether to prompt the user to re-select from the list of predetermined on-line radio programs. If the answer to the decision block 515 is no, the process flows to block 520 and the flow controller 82 sends a signal causing the Internet device 14 to connect to the server of a default on-line radio program. Otherwise, the scheme loops back to block 505 where the user is re-prompted to select from the list of on-line radio programs. For example, the process will loop back to block 505 a predetermined number of times before the flow controller 82 automatically causes the Internet device 14 to connect to the server of the default on-line radio station.

If the answer to decision block 510 is yes, the scheme flows to block 525 where the flow controller 82 sends a signal causing the Internet device 14 to connect to a server system of the selected on-line radio program. Next at block 530, the flow controller 82 determines the available bandwidth for sending the identified on-line radio program to the Internet device 14. The flow controller 82 can use a method substantially similar to the method described for FIG. 10. As shown at block 535, the Internet device 14 audio streams a predetermined-amount on-line radio programming. By continuously monitoring the available bandwidth between the first and second Internet devices 14, 16, the flow controller 82 can control the flow of on-line radio programming uploaded to the Internet device 14. Further, based on the network traffic determined by the flow controller 82, the buffer management system (not shown) can adjust the jitter buffer depth to ensure a more uniform playback of the on-line radio program.

Next at block 540, the Internet device 14 attempts to establish a communication channel between the initiating caller and receiving party at Internet device 16. If the receiving party is available, a communication channel can be established between the Internet devices 14, 16, as shown at block 545. Otherwise, the initiating caller can be prompted to enter a different telephone number, IP address, email address, or the like, to establish a communication channel with a third party, for example, at Internet device 18 or telephonic device 20, as described above. Before the Internet device 14 attempts to establish a communication channel with the third party, the flow controller 82 will determine the available bandwidth, and the playback module 88 will audio stream additional on-line radio programming. The user can cancel or discontinue the call at any time by hanging up the handset 72 or disconnecting the Internet device 14. Likewise, the user can cancel or discontinue the call if the Internet device 16 is busy or already in use.

The embodiment of FIG. 14 could be applied when the initiating caller uses a calling card, smart card, or the like to active the Internet device 14 and place a call. As discussed, by using the card to activate the Internet device 14, the consumer profile is automatically provided to the Internet device via the consumer code stored at the card. In this embodiment, the consumer profile would provide the user's musical interests and/or preferences. The code transmission/receipt module 80 of the Internet device 14 sends the consumer code to the registration module 46 which maps the consumer code to the previously stored user's consumer profile. Accordingly, the Internet device 14 connects to the server of the on line radio programming that is directed toward the user's interests.

In yet an additional embodiment of the present invention, the Internet device 14 allows the user to select between receiving on-line radio programming or advertisement information while waiting for the call between the initiating and receiving parties to be established.

With reference to FIG. 15, a flow diagram illustrates another embodiment of a method for providing advertisement information over the Internet 12 to a user. Here, the Internet device 14 does not stream audio or video information uploaded from the advertisement database 52.

Initially, at block 600, the initiating caller places a call to the receiving party using a call negotiation process described in co-pending U.S. patent application Ser. No. 09/543,381. Specifically, the call initialization module 76 at the first Internet device 14 places a call to the receiving party at the second Internet device 16. The call response module 78 of the first Internet device 14 can then determine whether a connection has been established between the parties.

At block 605, the memory manager 86 of the Internet device 14 determines which advertisement information is already stored in the memory unit 66 and how much memory is available to store new advertisement information. The flow controller 82 transmits a signal to the advertising module 48 which uses the memory status to identify advertisement information in the advertisement database 52 to upload to the Internet device 14, for example, the next sequential advertisement stored in the database 52, prioritization of advertisement information based on advertiser agreements, or by random selection. In determining the sequential order of advertisement information stored in the database 52, a pointer to the memory location identifies which advertisement was played last.

Concurrently, at block 610, the playback module 88 of the Internet device 14 plays back a predetermined amount of advertisement information stored in the "permanent memory" of the memory unit 66. The advertisements are played in an order arranged by the memory manager 86. For example, the playback module 88 will play back advertisement information in the reverse order received, e.g., start with the most recently received information.

Next at decision block 615, the user decides whether to continue waiting for the call to complete or to discontinue the call to the second Internet device 16 and receive additional information concerning the goods or services advertised in the then playing advertisement. If the user wishes to receive additional information, he can input his request via the user interface 56 or the voice interface 58. Then at block 620, the Internet device 14 terminates the original call establishment process and attempts to connect the user to the advertiser using the telephone access number provided by the advertiser.

If no such request is made, the process moves to decision block 625 where it is determined whether a connection can be established between the parties. If not, the process loops back to block 610, where the playback module 88 plays other advertisement information stored at the permanent memory area of the memory unit 66. The pointer in memory will track the next advertisement information to play to the user. The user can cancel or discontinue the call at any time by hanging up the handset 72 or disconnecting the Internet device 14. Likewise, the user can cancel or discontinue the call if the Internet device 16 is busy or already in use.

If the answer to decision block 625 is yes and the receiving party is available, a communication channel is established between the Internet devices 14, 16, and the parties can conduct their conversation, as shown at block 630. Next at block 635, the flow controller 82 will determine the amount of available bandwidth between the Internet device 14 and its associated ISP 22. In making this determination, the flow controller 82 determines the connection rate, or bandwidth available, from the Internet device 14 to its associated ISP 22 and subtracts the amount of bandwidth required to support a communication channel between the first and second Internet devices 14, 16. The bandwidth required to support a communication channel between the first and second Internet devices 14, 16 will depend upon the audio compression/decompression (codec) technique, e.g., G.711, G.723.1, or G.729A, being employed. The flow controller 82 will also consider the network traffic conditions. For example, when the network load is high, the flow controller 82 can transmit a signal causing the advertising module 48 not to send any advertisement information until the network traffic decreases to an acceptable level. In one embodiment of the invention, the flow controller 82 will also subtract a predefined amount of spare, or "cushion," bandwidth in determining the bandwidth available to receive advertisement information at the Internet device 14.

Next, the advertisement information identified by the advertising module 48 at step 605 is uploaded to the Internet device 14, as indicated at block 640. By continuously monitoring the bandwidth availability between the first and second Internet devices 14, 16, the flow controller 82 can control the flow of advertisement information uploaded to the Internet device 14 and thereby affect the efficiency of transmitting information.

As shown at block 645, the uploaded advertisement information is stored into temporary memory at the memory unit 66. The error controller 84 determines whether the Internet device 14 correctly received the entire data packets of advertisement information. If the error controller 84 determines that the received advertisement information data packets are not complete or contain errors, the error controller causes the advertising module 48 to re-transmit the required advertisement information data packets to the Internet device 14. Advertisement information that is complete and error-free, as determined by the error controller 84, is then moved from temporary memory to permanent memory at the memory unit 66 before playback by the voice interface 58. In addition, the memory manager 86 tracks which advertisement information has been played, wherein memory storing the played advertisement can be overwritten with new uploaded advertisement information. Moreover, the memory manager 86 will track the categories of advertisement information stored at the memory unit 66.

Figure 16:
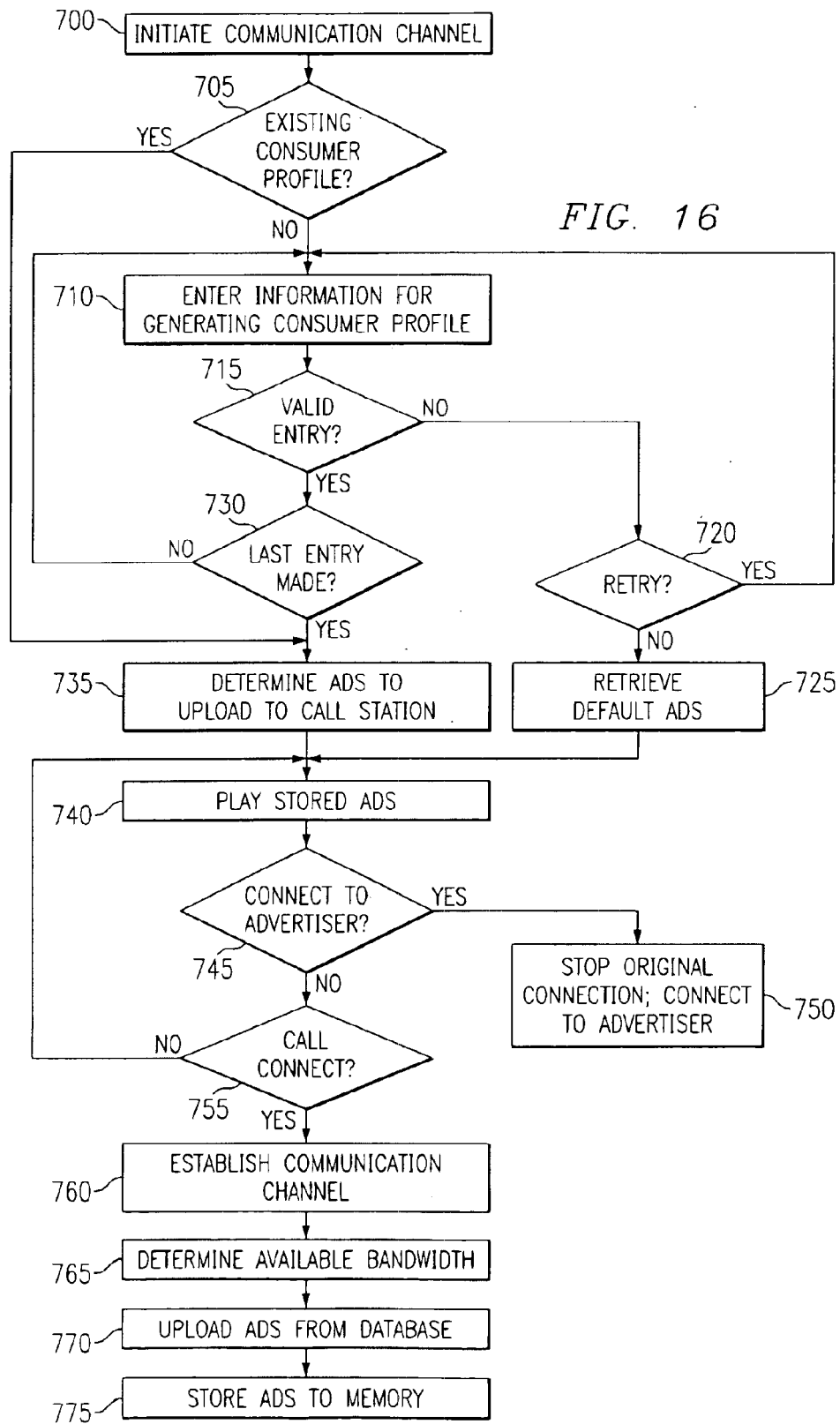
FIG. 16 is a flowchart showing a seventh and alternative embodiment of the method of providing on-line advertising.

As illustrated in FIG. 16, yet another embodiment of the on-line advertisement system, the process is substantially similar to the embodiment of FIG. 15, except that this alternative embodiment includes the additional steps for generating a consumer profile. Based on the consumer profile, the Internet device 14 receives advertisement information directed toward that particular user's interests, thereby promoting goods and services to an interested audience. The additional steps are described below.

At decision block 705, it is determined whether a consumer profile for the initiating caller already exists at the consumer database 50. For example, this determination may be accomplished by prompting the user to enter a consumer code or number corresponding to the consumer profile previously assigned to that user, as described above. Specifically, the initiating caller uses a calling card, smart card, or the like to active the Internet device 14 and place a call. By activating the Internet device 14 using the card, the consumer profile is automatically provided to the Internet device via the consumer code stored at the card. Similarly, a user can activate the Internet device 14 by directly entering his or her consumer code to the device.

If the registration module 46 determines that the user entered a valid consumer code, the consumer code is mapped to the previously stored user's consumer profile. Based on the consumer profile, the advertising module 48 can identify advertisement information directed toward that user's interests. Accordingly, the advertising module 48 identifies advertisement information directed toward that user's consumer profile. Otherwise, the Internet device 14 prompts the user to provide a wide variety of information for generating a consumer profile, as shown at block 710. The user enters his or her responses into the Internet device 14 by using the user interface 56 or the voice interface 58.

At decision block 715, it is determined whether the user properly responded at block 710. If not, the process flows to the decision block 720 where it is determined whether to prompt the user to re-enter a response. If the answer to the decision block 720 is no, the process flows to block 725 where the flow controller 82 sends a signal to the advertising module 48 to send advertisement information to the Internet device 14 based on predetermined criteria, as described above. Otherwise, the scheme loops back to block 710 where the user is re-prompted to enter information. For example, the process can loop back to block 710 a predetermined number of times before the flow controller 82 automatically signals the advertising module 48 to send advertisement information to the Internet device 14 based on predetermined criteria.

If the answer to decision block 715 is yes, the scheme flows to block 730 where it is determined whether the user has responded to the last question or provided all of the information required for generating a consumer profile. If there are unanswered questions or additional information is required, the process loops back to block 710, and the Internet device 14 prompts the user to enter additional responses. Otherwise, the registration module 46 generates a consumer profile of the user that is stored in the consumer database 50. A consumer code or number corresponding to the generated consumer profile is assigned and conveyed to the user so for future uses of the Internet device 14, the user can enter his or her consumer code and bypass the steps 710 through 730.

Figure 17:
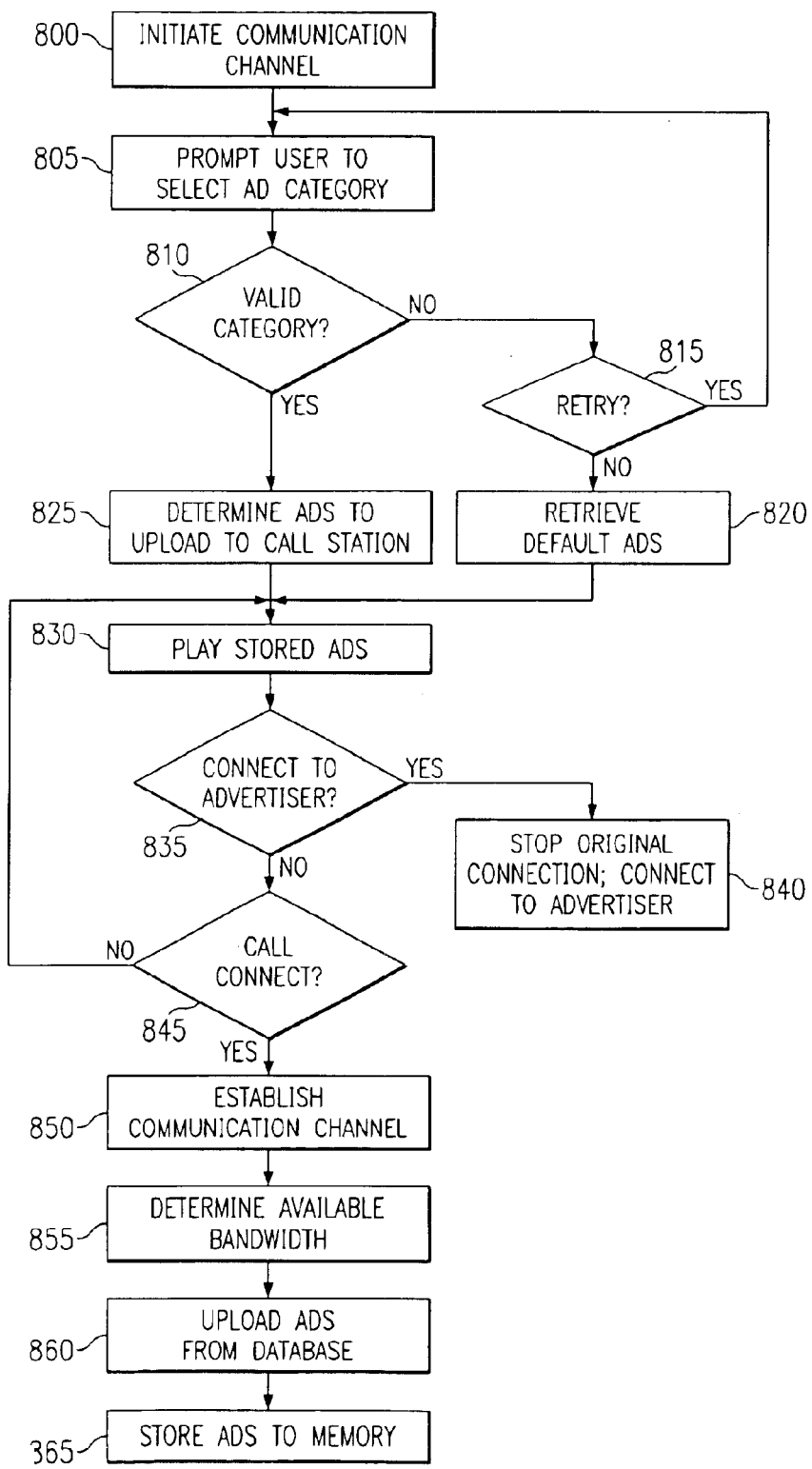
FIG. 17 is a flowchart showing an eighth and alternative embodiment of the method of providing on-line advertising.

According to another embodiment of the on-line advertisement system, with reference to FIG. 17, the process is substantially similar to the embodiment of FIG. 15, except that this alternative embodiment includes the additional steps for playing advertisements to the user based on the user's selected advertisement category. The additional steps are described below.

At block 805, the user is prompted to select from a list of predetermined advertising categories. Next at decision block 810, it is determined whether the user selected a valid advertising category. If not, the process flows to the decision block 815 where it is determined whether to prompt the user to re-select from the list of predetermined advertising categories. If the answer to the decision block 815 is no, the process flows to block 820 and the flow controller 82 sends a signal to the advertising module 48 to upload advertisement information to the Internet device 14 based on predetermined criteria. Otherwise, the scheme loops back to block 805 where the user is re-prompted to select from the list of advertising categories. For example, the process will loop back to block 805 a predetermined number of times before the flow controller 82 automatically signals the advertising module 48 and causes it to send the default advertisement information to the Internet device 14.

If the answer to decision block 810 is yes, the scheme flows to block 825 where the flow controller 82 sends a signal causing the advertising module 48 to identify information from the advertisement database 52 within the advertisement category selected at step 805. Next at block 830, the playback module 88 of the Internet device 14 plays back a predetermined amount of advertisement information stored in the "permanent memory" of the memory unit 66. The advertisements are played in an order arranged by the memory manager 86.

Figure 18:
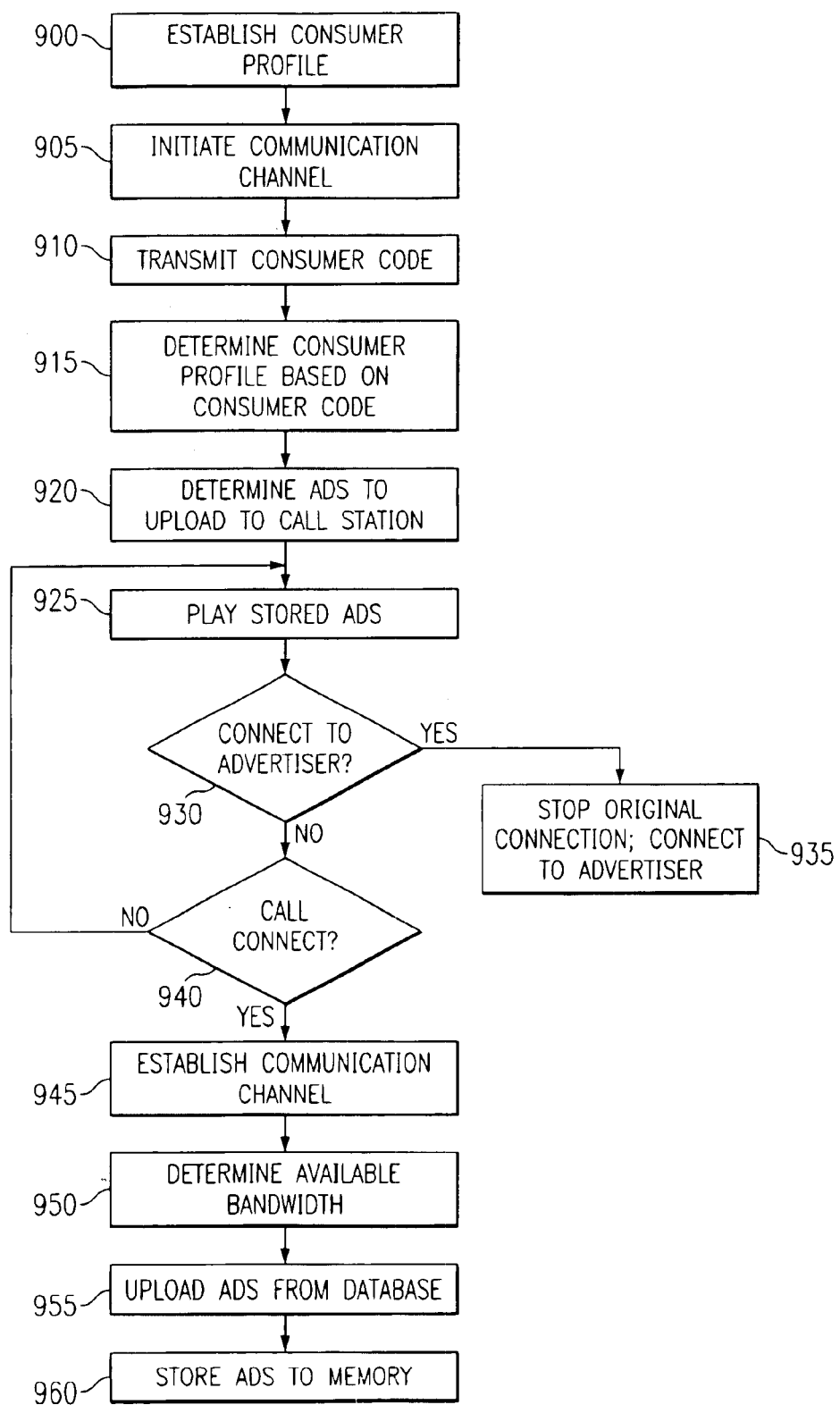
FIG. 18 is a flowchart showing a ninth and alternative embodiment of the method of providing on-line advertising.

With reference to FIG. 18, in an alternative embodiment of the on-line advertisement system, the process is substantially similar to the method FIG. 15, except that this alternative embodiment includes additional steps for establishing and using consumer profiles to identify appropriate advertisement information. The additional steps are described below.

At block 900, users establish their own personal consumer profiles that are stored at the consumer database 50. For example, each user enters a wide variety of information, via the user interface 56 or voice interface 58, that is sent to the registration module 46 for generating a personal consumer profile. Each consumer profile has an associated consumer code or number that the advertising module 48 uses to identify the types of products and services (i.e., advertisement information) mostly likely to interest a particular user. Such consumer code is also stored at the consumer database 50 and the memory unit 66 of the Internet device 14.

At block 905, the initiating caller uses the Internet device 14 to place a call with the receiving party at Internet device 16. For example, the initiating caller may use a calling card, smart card, or the like to active the Internet device 14 and place a call. By activating the Internet device 14 using the card, the consumer profile is automatically provided to the Internet device via the consumer code stored at the card. The initiating caller may also enter the consumer code via the user interface 56 or voice interface 58 to activate the Internet device 14. Then at block 910, the code transmission/receipt module 80 automatically transmits the consumer code to the registration module 46.

After receiving the consumer code, at block 915, the registration module 46 at the database server 30 searches the consumer database 50 and maps the user's consumer code with the previously stored consumer profile. As shown at block 920, based on the user's consumer profile, the advertising module 48 determines which advertisements in the advertisement database 52 are directed toward that consumer profile. Then the memory manager 66 and flow controller 82 determine the order in which to upload the advertisement information to the Internet device 14. For example, this prioritization is based on which advertisements are currently stored at the Internet device 14 (i.e., avoid repeat advertisements stored at the device), the amount of available bandwidth between the Internet device 14 and its associated ISP 22 (i.e., if network traffic is high, sending shorter advertisements), and other criteria.

It is within the scope of the present invention that the embodiments of FIGS. 10–18 are used in a payphone environment whereby a user activates the Internet device 14 to place a call with a receiving party. During the activation process, the user provides his or her consumer profile to the Internet device 14, for example, by means of direct input, calling card, smart card, or the like. After connecting to the Internet 12 and before the call is placed, as in FIGS. 10–14, or while the user waits for the connection to be established, as in FIGS. 15–18, the Internet device 14 plays advertisement information or streams on-line radio programming. Such advertisement information or on-line programming can be directed toward the user's interests based on his or her profile. The advertisers and on-line radio stations using this service would be charged by the Internet telephony service provider for the advertising or on-line radio time. Accordingly, the user is assessed lower per-minute toll charges, or no charges, by the Internet telephony service provider to place Internet telephony calls.

The present invention concerns a system and method for providing on-line advertising and information to connected users. While the invention has been described in detail with reference to the preferred embodiments thereof, it will be apparent to one skilled in the art that various changes and modifications can be made and equivalents employed without departing from the present invention.

We claim:

1. A system for providing information to a user connected to a data network, the system comprising:

a database for storing information;

a server associated with the database and having an information module, the information module responsive to a search request signal and sends information from the database corresponding to the search request signal; and a first station for initiating voice conversation with a second station, the first station storing a plurality of programming modules, the plurality of programming modules operable to:

store information at the first station, the information comprising audio information;

initiate voice communication to the second station;

play the information stored at the first station in response to initiating the voice communication to the second station;

determine an amount of bandwidth available to receive information from the database;

responsively affect the receiving of information from the database;

determine whether a request for additional information has been received;

connect the first station to a third station associated with the information, if a request for additional information has been received; and connect the first station to the second station, otherwise.

2. The system of claim 1, wherein the first station includes means for receiving personal information from a user and sending the search request signal based on said personal information.

3. The system of claim 1, wherein while the first station coupled for communication with the information module, a programming module monitors the amount of bandwidth available to receive information from the database.

4. The system of claim 1, wherein the first station has means for determining whether the information received from the database is properly received.

5. The system of claim 1, wherein the database stores the information in predetermined categories that the server uses for searching for information corresponding to the search request signal.

6. The system of claim 5, wherein the search request signal from the first station contains a code associated with at least one of the predetermined categories.

7. The system of claim 1, wherein the first station includes means for storing information received from the database and means for playing at least a portion of said information at a designated time.

8. The system of claim 7, wherein the first station plays at least one portion of the information before establishing a communication channel between the first and second stations.

9. The system of claim 8, wherein the first station receives information from the database after establishing the communication channel between the first and second stations.

10. The system of claim 1, wherein a programming module streams the information received from the database.

11. The system of claim 1, wherein the first station is a telephonic device and can establish a communication channel over a packet-switched network.

12. The system of claim 1, wherein the information is advertisements.

13. The system of claim 1, wherein the information is a plurality of music programs.

14. The system of claim 1, wherein the information is a plurality of stock quotation information.

15. A first station for providing information to a user connected to a network, the first station comprising:

a user interface for allowing a user to interact with the first station; and a storage medium having stored therein a plurality of programming modules, the plurality of programming modules operable to:

store information at the first station, the information comprising audio information;

initiate voice communication with a second station;

play the information received at the first station in response to initiating the voice communication to the second station;

determine an amount of communication bandwidth available to receive information at the first station;

responsively affect the receiving of the information at said first station based on the amount of bandwidth available;

determine whether a request for additional information has been received, connect the first station to a third station associated with the information, if a request for additional information has been received; and connect the first station to the second station, otherwise.

16. The first station of claim 15, wherein a programming module monitors the amount of communication bandwidth available to receive information from a server while the first station is in communication with the server.

17. The first station of claim 15, wherein a programming module streams information received at the first station.

18. The first station of claim 15, further comprising an error controller for determining whether information received at the first station is properly received.

19. The first station of claim 18, wherein in response to determining the information was not properly received at the first station, causing said information to be resent to the first station.

20. The first station of claim 15, wherein the storage medium providing storage of information received at the first station before playback.

21. The first station of claim 20, further comprising a memory manager for managing a memory allocation of the storage medium.

22. The first station of claim 15, further comprising a code module for receiving personal information from a user and sending a code associated with the personal information to a server.

23. A method for providing information to a user connected to a data network, the method comprising the steps of:

establishing a communication channel between a first station and a server, the server associated with a database, the first station storing a plurality of programming modules;

identifying information to send to the first station from the database;

determining an amount of communication bandwidth available between the first station and the server;

receiving information at the first station responsive to the amount of communication bandwidth available between the first station and the server for providing to a user;

storing information at the first station, the information comprising audio information;

initiating voice communication to a second station; and playing the information in response to initiating the voice communication to the second station;

determining whether a request for additional information has been received;

connecting the first station to a third station associated with the information, if a request for additional information has been received; and connecting the first station to the second station, otherwise.

24. The method of claim 23, further comprising the steps of:

storing the received information at the first station having a memory; and providing the received information to the user at a designated time.

25. The method of claim 23, further comprising the step of establishing a communication channel between the first station and a second station.

26. The method of claim 25, wherein the step of receiving information at the first station occurs after the step of establishing a communication channel between the first station and the second station.

27. The method of claim 25, wherein the step of receiving information at the first station occurs before the step of establishing a communication channel between the first station and the second station.

28. The method of claim 25, further comprising the steps of:

terminating the establishing of the communication channel between the first and second stations and performing a step of establishing a communication channel between the first station and a third station if said first station sends a connection request to establish the communication channel with the third station.

29. The method of claim 25, further comprising the steps of:

prior to performing the step of establishing a communication channel between the first and second stations, determining whether the first station sends a connection request to establish a communication channel with a third station; and terminating the establishing of the communication channel between the first and second stations and performing a step of establishing the communication channel between the first and third stations if said first station sends the connection request.

30. The method of claim 23, further comprising the steps of:

receiving personal information at the first station from a user; and receiving the personal information at the server.

31. The method of claim 30, wherein the step of identifying information to send to the first station is responsive to the personal information received at the server.

32. The method of claim 31, further comprising the step of determining whether personal information was already received at the first station from the user.

* * * * *